US008777728B2

(12) United States Patent
Boesen

(10) Patent No.: US 8,777,728 B2
(45) Date of Patent: Jul. 15, 2014

(54) GAMING SYSTEM AND A METHOD OF GAMING

(75) Inventor: John Leslie Boesen, Menai (AU)

(73) Assignee: Aristocrat Technologies Australia Pty Ltd. (AU)

( * ) Notice: Subject to any disclaimer, the term of this patent is extended or adjusted under 35 U.S.C. 154(b) by 43 days.

(21) Appl. No.: 12/118,148

(22) Filed: May 9, 2008

(65) Prior Publication Data

US 2008/0287184 A1 Nov. 20, 2008

(30) Foreign Application Priority Data

May 16, 2007 (AU) ................................ 2007902614

(51) Int. Cl.
*A63F 9/24* (2006.01)
*A63F 13/00* (2014.01)

(52) U.S. Cl.
USPC .................................. 463/23; 463/36; 463/42

(58) Field of Classification Search
USPC ............................................... 463/20, 21, 36
See application file for complete search history.

(56) References Cited

U.S. PATENT DOCUMENTS

| | | | | |
|---|---|---|---|---|
| 4,669,731 | A * | 6/1987 | Clarke | 463/20 |
| 5,393,057 | A | 2/1995 | Marnell, II | |
| 5,655,961 | A * | 8/1997 | Acres et al. | 463/27 |
| 5,695,402 | A * | 12/1997 | Stupak | 463/20 |
| 5,722,891 | A * | 3/1998 | Inoue | 463/20 |
| 5,910,048 | A * | 6/1999 | Feinberg | 463/25 |
| 5,980,384 | A * | 11/1999 | Barrie | 463/16 |
| 5,997,401 | A * | 12/1999 | Crawford | 463/20 |
| 6,015,344 | A * | 1/2000 | Kelly et al. | 463/16 |
| 6,033,307 | A * | 3/2000 | Vancura | 463/20 |
| 6,059,289 | A * | 5/2000 | Vancura | 273/143 R |
| 6,068,552 | A * | 5/2000 | Walker et al. | 463/21 |
| 6,113,493 | A * | 9/2000 | Walker et al. | 463/25 |
| 6,165,071 | A * | 12/2000 | Weiss | 463/24 |
| 6,227,971 | B1 | 5/2001 | Weiss | |
| 6,234,897 | B1 * | 5/2001 | Frohm et al. | 463/20 |
| 6,254,483 | B1 * | 7/2001 | Acres | 463/26 |
| 6,302,793 | B1 * | 10/2001 | Fertitta et al. | 463/25 |
| 6,368,216 | B1 * | 4/2002 | Hedrick et al. | 463/20 |
| 6,394,902 | B1 * | 5/2002 | Glavich et al. | 463/20 |
| 6,398,218 | B1 * | 6/2002 | Vancura | 273/138.1 |
| 6,561,903 | B2 * | 5/2003 | Walker et al. | 463/25 |
| 6,648,759 | B2 * | 11/2003 | Vancura | 463/20 |
| 6,685,563 | B1 * | 2/2004 | Meekins et al. | 463/25 |
| 6,692,353 | B2 * | 2/2004 | Walker et al. | 463/16 |

(Continued)

FOREIGN PATENT DOCUMENTS

| | | | |
|---|---|---|---|
| AU | 1256801 | | 6/2001 |
| CA | 2514156 | A1 | 1/2007 |

(Continued)

*Primary Examiner* — Steven J Hylinski
(74) *Attorney, Agent, or Firm* — McAndrews, Held & Malloy, Ltd.

(57) ABSTRACT

Certain embodiments provide a gaming system including a first player interface operable by a player to input at least one first game instruction to play a first game. The gaming system also includes a second player interface independent of the first player interface and operable by the player to play a second game. The gaming system further includes a game control module arranged to process the at least one first game instruction to determine a game outcome of the first game and control play of the second game based at least in part on the game outcome of the first game.

20 Claims, 6 Drawing Sheets

(56) References Cited

U.S. PATENT DOCUMENTS

| | | | | |
|---|---|---|---|---|
| 6,780,111 | B2 * | 8/2004 | Cannon et al. | 463/25 |
| 6,800,026 | B2 * | 10/2004 | Cannon | 463/16 |
| 6,852,031 | B1 * | 2/2005 | Rowe | 463/29 |
| 6,939,229 | B2 * | 9/2005 | McClintic | 463/25 |
| 6,984,174 | B2 * | 1/2006 | Cannon et al. | 463/25 |
| 7,025,674 | B2 * | 4/2006 | Adams et al. | 463/1 |
| 7,033,272 | B1 * | 4/2006 | Mason | 463/25 |
| 7,052,392 | B2 * | 5/2006 | Tessmer et al. | 463/16 |
| 7,291,068 | B2 * | 11/2007 | Bryant et al. | 463/25 |
| 7,316,613 | B2 * | 1/2008 | Luccesi et al. | 463/20 |
| 7,326,115 | B2 * | 2/2008 | Baerlocher | 463/25 |
| 7,344,444 | B2 * | 3/2008 | Suzuki | 463/36 |
| 7,357,714 | B2 * | 4/2008 | Tessmer et al. | 463/16 |
| 7,419,425 | B1 * | 9/2008 | Crowder et al. | 463/16 |
| 7,674,180 | B2 * | 3/2010 | Graham et al. | 463/29 |
| 7,727,072 | B2 * | 6/2010 | Crowder et al. | 463/42 |
| 7,785,186 | B2 * | 8/2010 | Tessmer et al. | 463/16 |
| 7,883,406 | B2 * | 2/2011 | Vancura | 463/20 |
| 8,033,912 | B2 * | 10/2011 | Cannon | 463/25 |
| 2002/0198044 | A1 * | 12/2002 | Walker et al. | 463/25 |
| 2003/0036423 | A1 * | 2/2003 | Vancura | 463/20 |
| 2003/0109307 | A1 | 6/2003 | Boyd | |
| 2004/0092301 | A1 | 5/2004 | Williams | |
| 2004/0097286 | A1 * | 5/2004 | Vancura | 463/26 |
| 2004/0242325 | A1 | 12/2004 | Levitan | |
| 2004/0266536 | A1 | 12/2004 | Mattice | |
| 2005/0012268 | A1 | 1/2005 | Moshal | |
| 2005/0026679 | A1 * | 2/2005 | Lucchesi et al. | 463/20 |
| 2005/0096114 | A1 * | 5/2005 | Cannon et al. | 463/16 |
| 2005/0148383 | A1 | 7/2005 | Mayeroff | |
| 2005/0230917 | A1 | 10/2005 | Jackson | |
| 2006/0014583 | A1 | 1/2006 | Harris | |
| 2006/0040735 | A1 * | 2/2006 | Baerlocher | 463/26 |
| 2006/0091604 | A1 | 5/2006 | Sargent | |
| 2006/0097450 | A1 | 5/2006 | Labetti | |
| 2006/0145420 | A1 | 7/2006 | Micarelli | |
| 2006/0189379 | A1 | 8/2006 | Pacey | |
| 2006/0205476 | A1 | 9/2006 | Jubinville | |
| 2006/0205480 | A1 * | 9/2006 | Glavich et al. | 463/20 |
| 2006/0246980 | A1 | 11/2006 | Walker | |
| 2006/0247003 | A1 * | 11/2006 | Macke | 463/20 |
| 2006/0252546 | A1 * | 11/2006 | Castellari et al. | 463/42 |
| 2006/0258426 | A1 * | 11/2006 | Seelig et al. | 463/16 |
| 2006/0281518 | A1 | 12/2006 | Sims | |
| 2006/0287035 | A1 | 12/2006 | Walker | |
| 2007/0054729 | A1 | 3/2007 | Hornik | |
| 2008/0026816 | A1 * | 1/2008 | Sammon et al. | 463/20 |

FOREIGN PATENT DOCUMENTS

| | | | |
|---|---|---|---|
| CA | 2525057 | A1 | 2/2007 |
| DE | 102004041481 | A1 | 3/2006 |
| GB | 2419999 | A | 5/2006 |
| GB | 2426718 | A | 12/2006 |
| IE | 20020907 | A1 | 6/2004 |
| MX | 04002888 | A | 7/2004 |
| WO | 0045242 | A2 | 8/2000 |
| WO | 0134259 | A1 | 5/2001 |
| WO | 2005025693 | A2 | 3/2005 |
| WO | 2005107899 | A1 | 11/2005 |
| WO | 2007005846 | A2 | 1/2007 |
| WO | 2007008441 | A2 | 1/2007 |
| WO | 2007011621 | A2 | 1/2007 |
| WO | 2007026468 | A1 | 3/2007 |

* cited by examiner

GAMING SYSTEM AND A METHOD OF GAMING

CROSS-REFERENCE TO RELATED APPLICATIONS

This application claims priority to Australian Provisional Patent Application No. 2007902614, having an international filing date of May 16, 2007, entitled "A Gaming System and a Method of Gaming," which is hereby incorporated by reference herein in its entirety.

FIELD

The present invention relates to a gaming system and a method of gaming.

BACKGROUND TO THE INVENTION

Some players are more inclined to play one type of game than another. For example, the player may prefer the look and feel of a game or types of prize awarded in a game. Other factors may also affect a player's playing habits such as the types of games traditionally played at the venue where the player plays. Traditional attempts to encourage players to play new games or other types of games are centered around advertising those types of games to the player with signage or the like.

There is a need for an alternative technique for encouraging players to try other games.

SUMMARY OF INVENTION

In a first aspect, the invention provides a gaming system including:

- a first player interface operable by a player to input at least one first game instruction to play a first game;
- a second player interface independent of the first player interface and operable by the player to play a second game; and
- a game control module arranged to process the at least one first game instruction to determine a game outcome of the first game and control play of the second game based at least in part on the game outcome of the first game.

In an embodiment, the game control module controls play of the second game by modifying play of the second game.

In an embodiment, the game control module controls play of the second game by adjusting the game outcome of the second game, based on the outcome of the first game.

In an embodiment, the game control module controls play of the second game by adjusting the possible outcomes of the second game based on the outcome of the first game.

In an embodiment, the outcome of a game is adjusted by modifying a win amount and/or win odds.

In an embodiment, the possible outcomes of a game are adjusted by adjusting available prizes and/or types of prizes.

In an embodiment, the game control module controls play of the second game by providing free games in the second game.

In an embodiment, the second player interface is operable by the player to input at least one second game instruction and the game control module processes the at least one second game instruction to determine a game outcome of the second game based both on the processing of the at least one second game instruction and the game outcome of the first game to thereby control the game outcome of the second game.

In an embodiment, the game control module includes a first game controller arranged to determine the game outcome of the first game and a second game controller in data communication with the first game controller and arrange to determine the game outcome of the second game.

In an embodiment, the first game controller is arranged to determine adjustment data based on the first game outcome and communicate the adjustment data to the second game controller, and the second game controller is arranged to determine the second game outcome based on the adjustment data.

In an embodiment, the first game controller is arranged to communicate the first game outcome to the second game controller.

In an embodiment, the first player interface is provided by a player marketing module.

In an embodiment, the first game controller is provided by a player marketing module.

In an embodiment, the second player interface is provided by an electronic gaming machine.

In an embodiment, the second game controller is provided by an electronic gaming machine.

In an embodiment, the first game controller is connected to the electronic gaming machine via a serial port of the electronic gaming machine.

In an embodiment, the first player interface includes a first display and a first instruction input mechanism.

In an embodiment, the second player interface includes a second display and a second instruction input mechanism.

In a second aspect, the invention provides a method of gaming including:

- receiving an input of at least one first game instruction in relation to a first game by a player via a first player interface;
- processing the at least one first game instruction to determine a game outcome of the first game; and
- controlling play of a second game via a second player interface independent of the first player interface based at least in part on the game outcome of the first game.

In an embodiment, the method of gaming includes controlling play of the second game by adjusting the game outcome of the second game, based on the outcome of the first game.

In an embodiment, the method of gaming includes adjusting the possible outcomes of the second game based on the outcome of the first game.

In an embodiment, the outcome of a game is adjusted by modifying a win amount and/or win odds.

In an embodiment, the possible outcomes of a game are adjusted by adjusting available prizes and/or types of prizes.

In an embodiment, the method of gaming includes controlling play of the second game by providing free games in the second game.

In a third aspect, the invention provides computer program code which when executed implements the above method.

In a fourth aspect, the invention provides a computer readable medium including the computer program code.

In a fifth aspect, the invention provides a data signal including the above computer program code.

In a sixth aspect, the invention provides transmitting or receiving the above computer program code.

Figure 1:
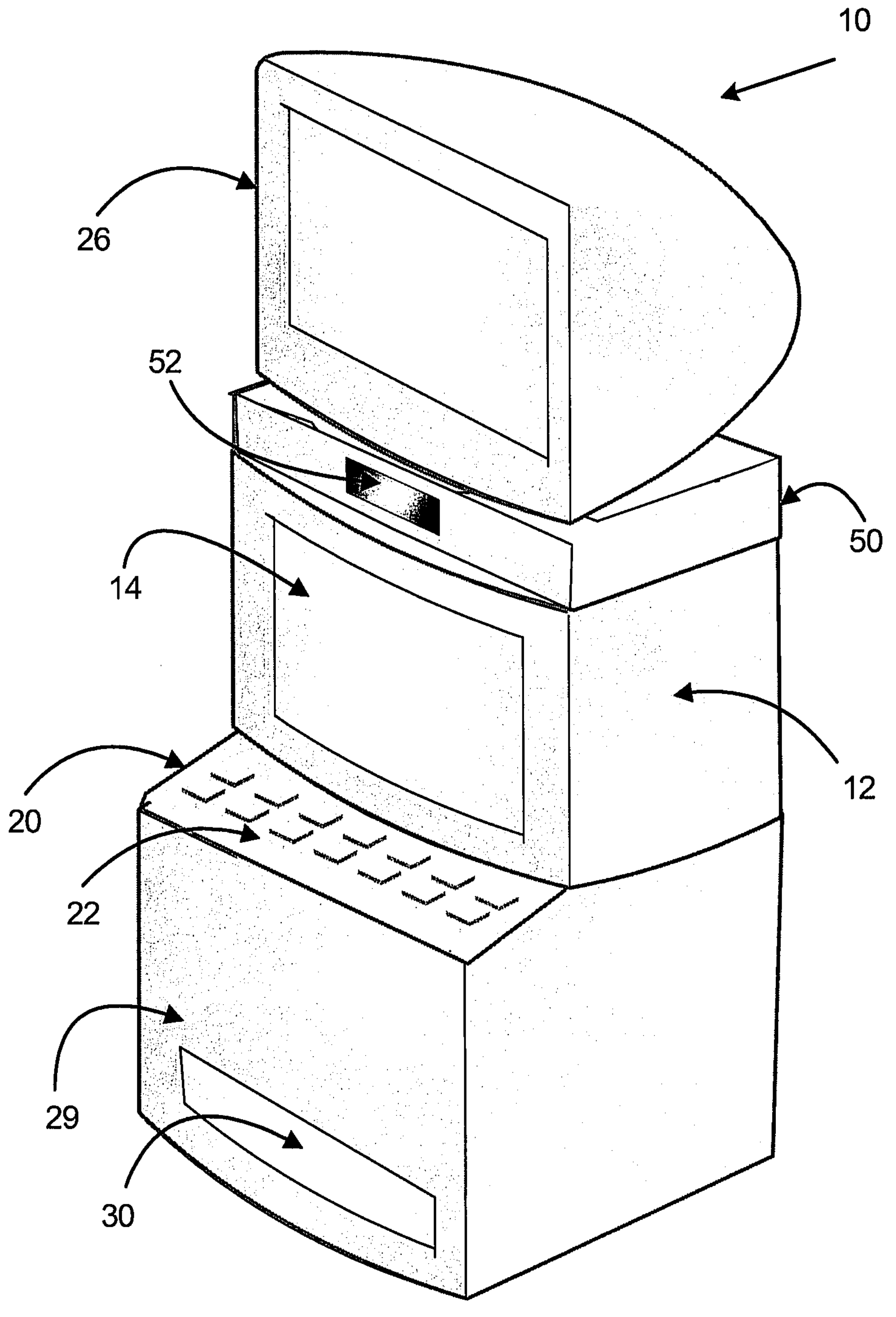
FIG. 1 is a perspective view of a gaming machine of an exemplary embodiment.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Referring to the drawings, there is shown a gaming system wherein a player operates a first player interface to play a first game and a second player interface to play a second game. The game system has a game control module that controls play of the second game based on game outcomes of the first game. The embodiment advantageously employs a player marketing module to provide one of the player interfaces. The gaming system can take a number of different forms.

In a first form, a stand alone gaming machine is provided wherein all or most components for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

A gaming system in the form of a stand alone gaming machine 10 is illustrated in FIG. 1. The gaming machine 10 includes a console 12 having a display 14 on which is displayed representations of a game that can be played by a player. A mid-trim 20 of the gaming machine 10 houses a bank of buttons 22 for enabling a player to interact with the gaming machine, in particular during game play. The mid-trim 20 also houses a credit input mechanism for example a coin input chute and/or a bill collector 24B. Other credit input mechanisms may also be employed, for example, a card reader for reading a smart card, debit card or credit card.

Artwork and/or information, for example pay tables and details of bonus awards and other information or images relating to the game may be provided on a front panel 29 of the console 12. A coin tray 30 is mounted beneath the front panel 29 for dispensing cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 also includes a display which may be of the same type as the display 14, or of a different type.

A player marketing module (PMM) 50 having a display 52 is connected to the gaming machine 10. The main purpose of the PMM 50 is to allow the player to interact with a player loyalty system. The PMM has a magnetic card reader for the purpose of reading a player tracking device in the form of a magnetic swipe card, for example as part of a loyalty program. However other reading devices may be employed and the player tracking device may be in the form of a card, flash drive or any other portable storage medium capable of being read by the reading device.

Figure 2:
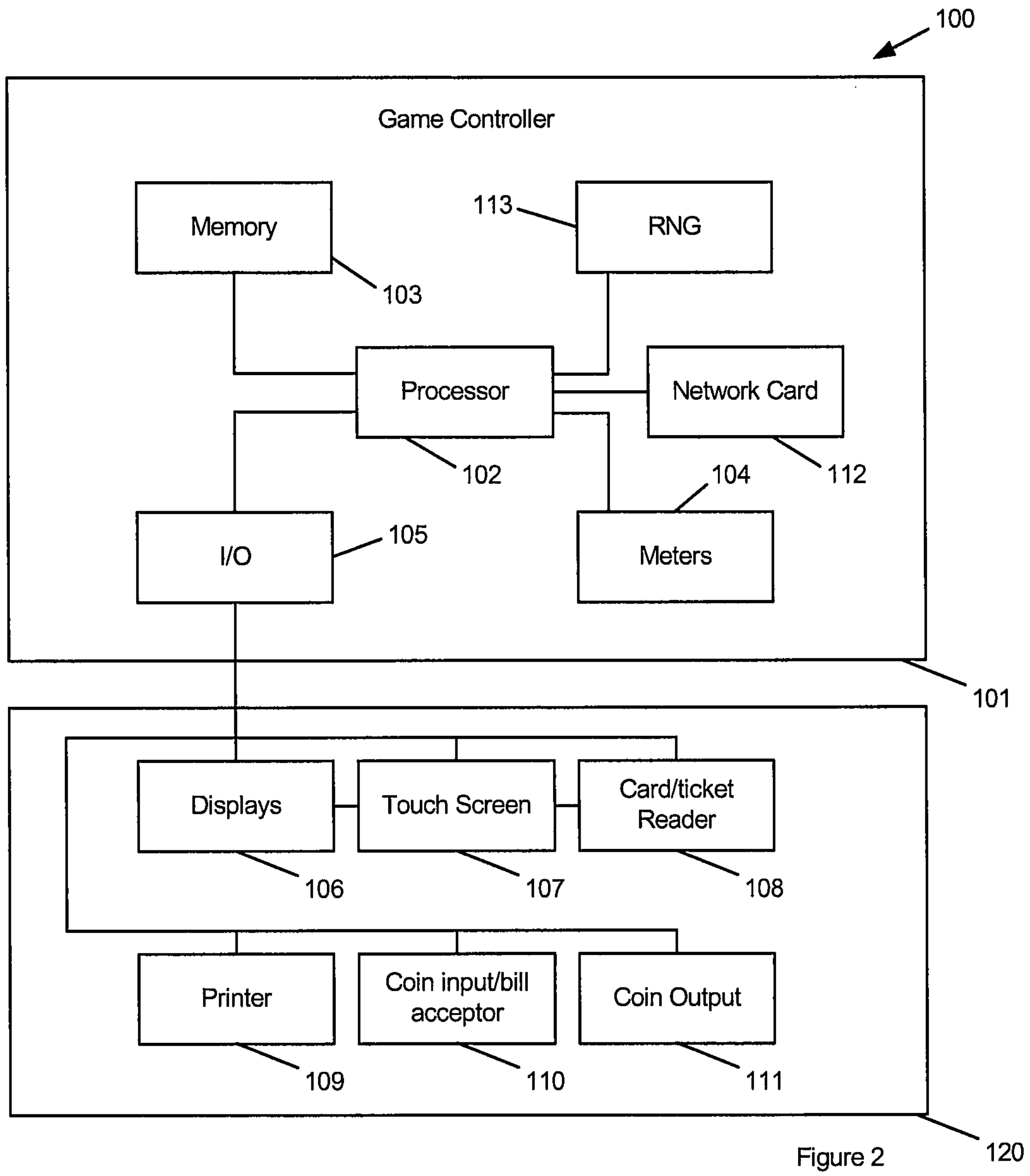
FIG. 2 is a block diagram of a gaming machine of the embodiments.

FIG. 2 shows a block diagram of operative components of a typical gaming machine which may be the same as or different to the gaming machine of FIG. 1.

The gaming machine 100 includes a game controller 101 having a processor 102. Instructions and data to control operation of the processor 102 are stored in a memory 103, which is in data communication with the processor 102. Herein the term "processor" is used to refer generically to any device that can process game play instructions in accordance with game play rules and may include: a microprocessor, microcontroller, programmable logic device or other computational device, a general purpose computer (e.g. a PC) or a server.

Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 2, a player interface 120 includes peripheral devices that communicate with the game controller 101 comprise one or more displays 106, a touch screen 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 3:
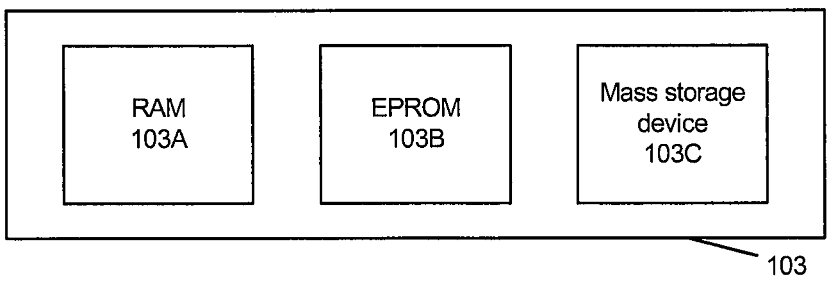
FIG. 3 is a block diagram of the memory of a gaming machine.

FIG. 3 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 4:
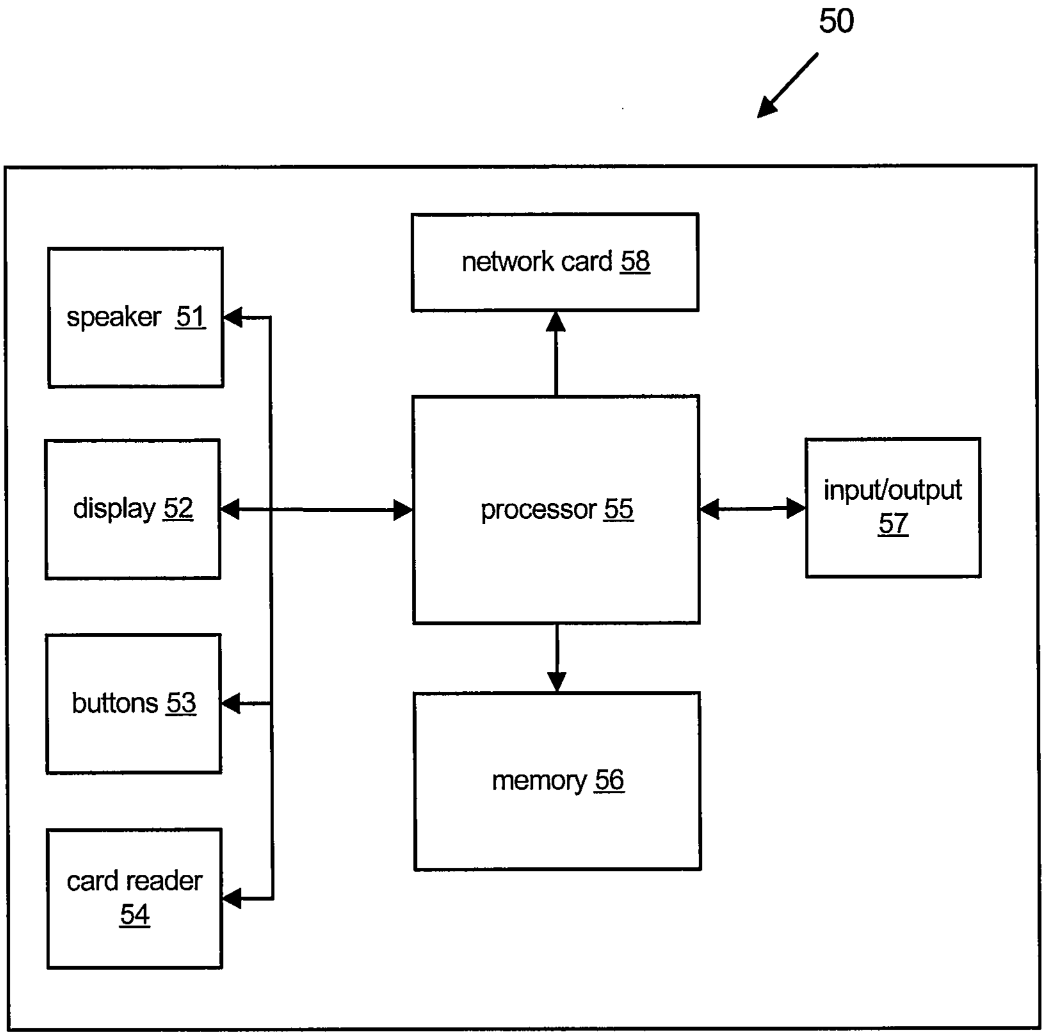
FIG. 4 is a block diagram of a player marketing module of the gaming system of the embodiment.

FIG. 4 is a block diagram of a player marketing module 50. The player marketing module 50 is connected via input/output port 57 to a serial input output port of the input/output section 105 of the electronic gaming machine. The player marketing module has a card reader 54 and a display 52 which may be a larger touch screen display. The PMM 50 may also have buttons 53 for receiving a player input (at least in embodiments where there is no touch screen display) and a speaker 51. Input received from the card reader 54 is processed by processor 55 based on the data stored in memory 56. The PMM 50 is connected to the loyalty system by a network card 58.

Figure 5:
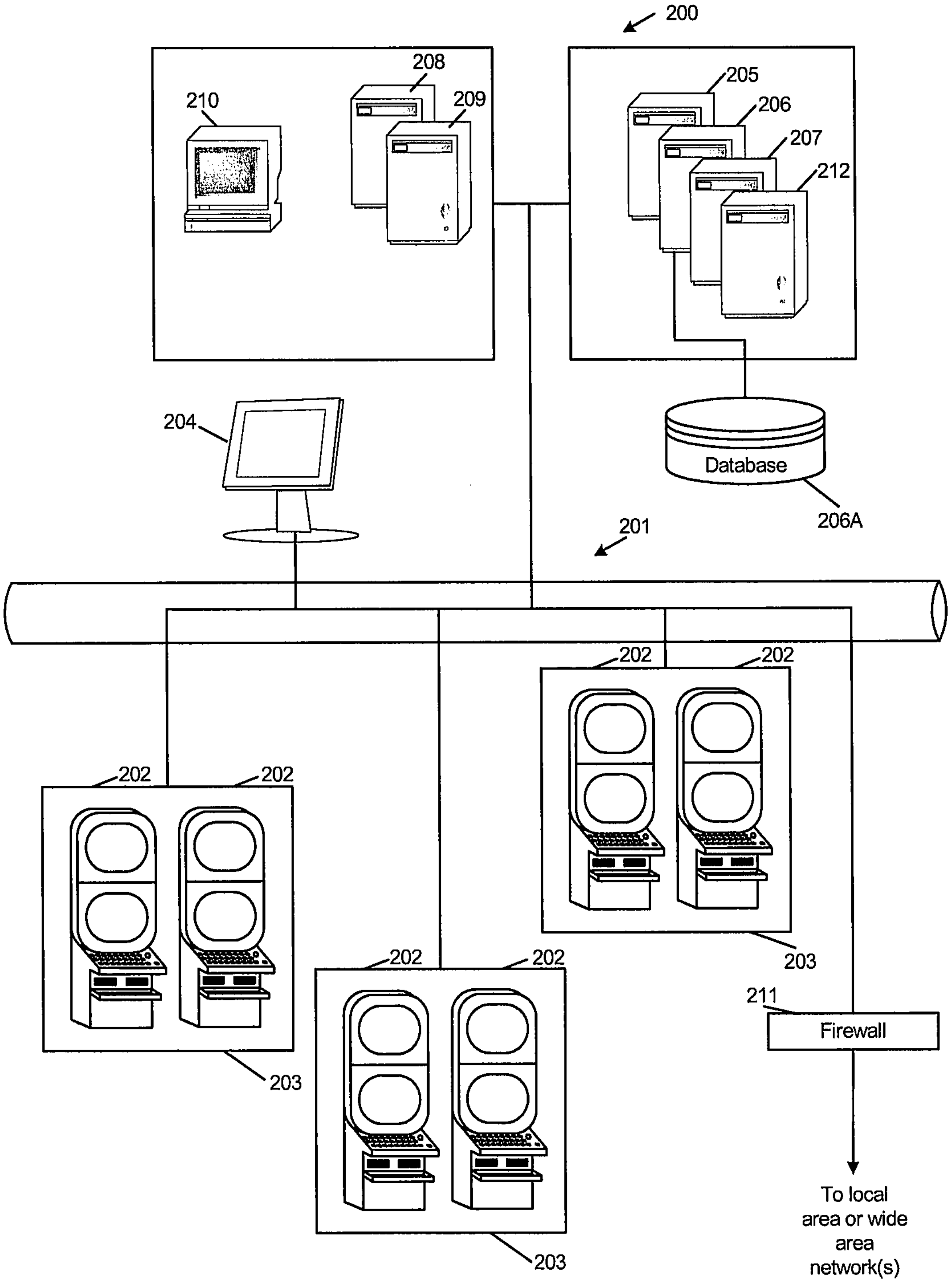
FIG. 5 is a block diagram of a networked architecture of a gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 1 and 2, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to implement at least the accounting functions for a Jackpot game. Server 212 host the player loyalty program.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

Figure 6:
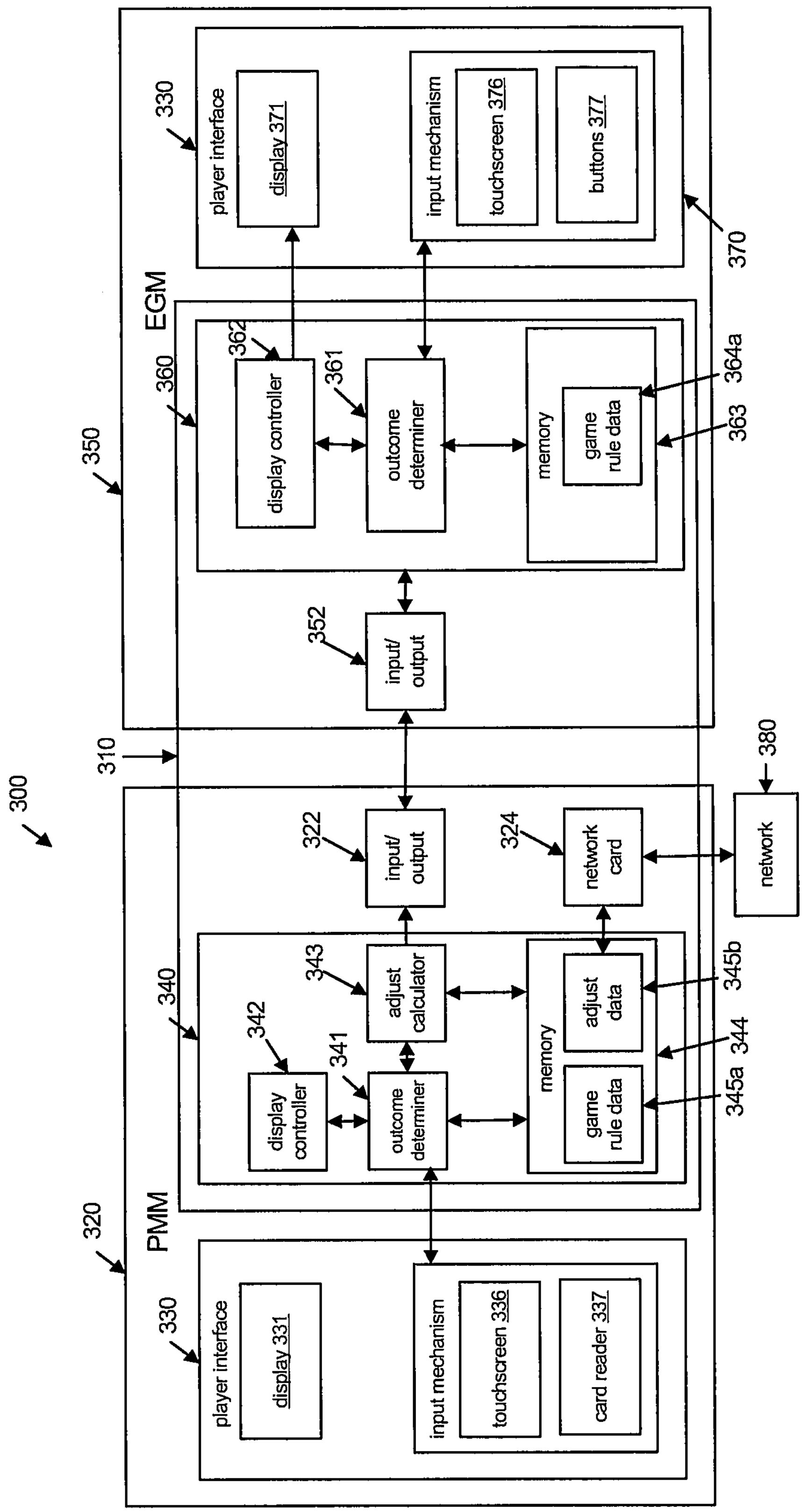
FIG. 6 is a functional block diagram of a gaming system of the embodiment.

FIG. 6 illustrates the gaming system 300 of the embodiment in more detail. A player marketing module 320 of the type shown in FIG. 4 is used to play a first game while an electronic gaming machine 350 is used to play a second game. Outcomes of the first game played with the player marketing module (PMM) 320 influence the play of the electronic gaming machine 350. Therefore, in one embodiment the player marketing module 320 may be used to play a game with which the player is familiar such as a table or card game and the electronic gaming machine 350 may be used to play a game with which the player is less familiar such as a spinning reel slot game. A person skilled in the art will appreciate that the situations can be reversed and games played on the electronic gaming machine could be caused to modify games played on player marketing module instead. For example, the player may be introduced to a new game via the PMM on the basis that it can improve results of an existing game they have chosen to play. Further, in some embodiments the games may both be known to a player. In this embodiment, the technique of altering the outcome of one game based on play of another game can still provide additional enjoyment. The first game may influence the second game in a number of different manners, including altering the return to player, providing free games of the second game, etc. The first and second games may be connected in appearance or theme in some way if this is desired. Depending on the embodiment, play of the first game may be free or paid for by loyalty points or credits associated with a player account accessible using the PMM. In another embodiment, the PMM could be modified to deduct credit from the gaming machine or to include a credit input mechanism.

The player marketing module 320 includes a user interface 330. A player activates the player marketing module by inserting their card into card reader 337 of the input mechanism 335. The players' details are sent via network card 324 over the network 380 to a player loyalty system (such as loyalty server 212 shown in FIG. 5) where the player's identify is verified. Once the player identity has been verified, the players name is displayed on display 331. In the embodiment, the input mechanism 335 incorporates a touch screen 336 in order for the player to play a game. For example, the game may be blackjack. The player employs the touch screen 336 to place bets on the outcome of the game and makes selections using the touch screen, such as whether to obtain additional cards to try to form a winning hand, in order to play the game.

The PMM 320 has a first game controller 340, includes an outcome determiner 341 for determining the outcome of a game based on game rule data 345*a* stored in memory 344. These outcomes are displayed under control of the display controller 342 on display 231. The outcome of the game is also provided to an adjustment calculator 343 which calculates whether an adjustment should be generated based on adjustment data 345*b* stored in the memory 344 which specifies the basis on which adjustments are calculated. If an adjustment is determined, data specifying the adjustment is output via input/output port 322 to the input/output port 352 of the electronic gaming machine 350. The outcome determiner 361 of the electronic gaming machine 350 is arranged to determine outcomes of the electronic gaming machine based on the adjustment data sent to it by the PMM 320, the game rule data 364*a* stored in memory 363 and player instructions input by the input mechanism 375 which may include a touch screen 376 and/or buttons 377. The outcomes are then displayed on display 371 under control of the display controller 362.

In the embodiment, the first game controller 340 of the player marketing module and the electronic gaming machine game controller 360 are shown as forming part of a gaming control module 310 of the gaming system 30 to emphasise the fact that certain of the functions may be distributed differently than explicitly shown in FIG. 6. For example, the calculation of an adjustment to the game play to thereby control game play of the second game played on the electronic gaming machine, could be calculated from game outcomes communicated from the PMM to the EGM rather than the adjustment being calculated by the PMM and communicated to the EGM. Similarly, some PMMs may have hardware limitations that make it difficult for them to calculate outcomes for games by themselves. In such instances game controller 360 of the EGM may carry out part of the game played on the PMM. For example it may perform a random number selection for the PMM.

A person skilled in the art will appreciate that other variations are possible, for example in the primary game a special win may trigger free games on the EGM. Further the PMM may allocate a percentage of its earnings toward a hidden progressive meter. The value of the hidden progressive meter may be used to increase the return offered by the secondary game.

The primary game's return to player percentage (RTP) may be lower than normal but offer better odds to the player on the secondary game provided game on the primary game is one for one with play on the secondary game. In other embodiments the secondary game played on the EGM may impact the outcomes of the primary game or both games may impact one another.

Figure 7:
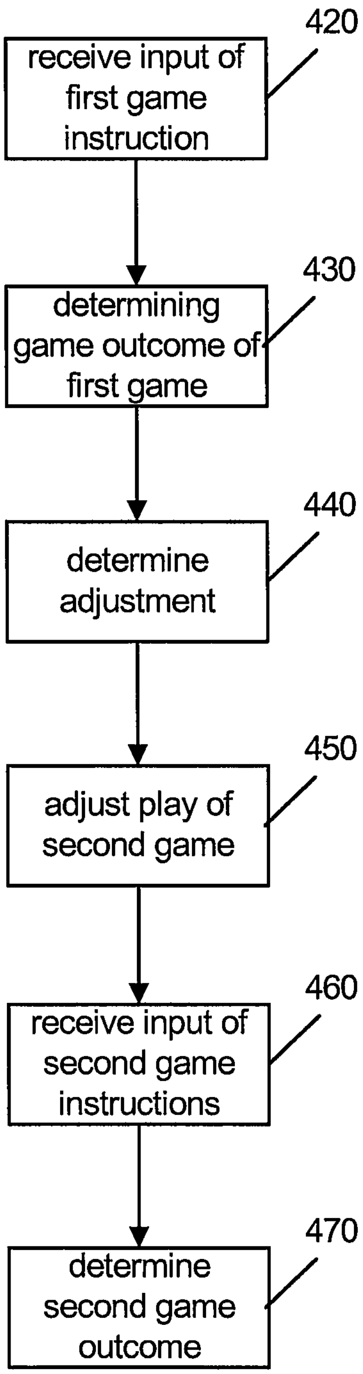
FIG. 7 is a flowchart of a gaming method of the embodiment.

FIG. 7 is a flow chart of the gaming method of an embodiment. Input of a first game instruction is received 420 in order to play the first game and a game outcome of the first game is determined 430. It is then determined whether an adjustment should be applied to the second game 440. If an adjustment is determined, play of the second game is adjusted 450. A player then inputs instructions into the second game 460 and a second game outcome is determined 470.

Various other modifications will be apparent to persons skilled in the art and should be considered as falling within the scope of the invention described herein, in particular features of particular embodiments can be used to form further embodiments.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that any reference to prior herein does not constitute an admission that the prior art forms a part of the common general knowledge in the art in any country.

The invention claimed is:

1. A gaming machine comprising:

a first game controller configured to facilitate a free play of a first game at said gaming machine;

a first player interface operable by a player to input to the first game controller at least one first game instruction for the free play of the first game at said gaming machine;

a second game controller configured to facilitate a play of a second game at said gaming machine, said second game being different than said first game, the second game controller having an adjustment calculator configured to calculate whether an adjustment to the play of the second game should be generated; and a second player interface operable by the player for the play of the second game at said gaming machine;

and wherein the first game controller and the second game controller are electrically coupled to each other, the first game controller being configured to process the at least one first game instruction to determine a first game outcome for the play of the first game and to provide adjustment data as to the first game outcome to the adjustment calculator of said second game controller;

wherein said adjustment calculator is configured to calculate whether an adjustment to play of the second game should be generated based on said adjustment data, and to send an adjustment command to the second game controller, the second game controller being configured to adjust the play of the second game based at least in part on receiving the adjustment command.

2. A gaming machine as claimed in claim 1, wherein the second game controller adjusts the play of the second game by modifying play of the second game.

3. A gaming machine as claimed in claim 2, wherein the second game controller adjusts the play of the second game by adjusting the game outcome of the second game, based on the adjustment command.

4. A gaming machine as claimed in claim 3, wherein the possible outcome of a second game is adjusted by modifying a win amount.

5. A gaming machine as claimed in claim 2, wherein the second game controller adjusts the play of the second game by adjusting the possible outcomes of the second game based on the adjustment command.

6. A gaming machine as claimed in claim 5, wherein the possible outcomes of a second game are adjusted by adjusting available prizes and/or types of prizes.

7. A gaming machine as claimed in claim 2, wherein the second game controller adjusts the play of the second game by providing free games in the second game.

8. A gaming machine as claimed in claim 1, wherein the second game controller processes a second game instruction to determine a game outcome of the second game based both on the processing of the second game instruction and the adjustment command to thereby control the game outcome of the second game.

9. A gaming machine as claimed in claim 1, wherein the second game controller in data communication with the first game controller determines the game outcome of the second game.

10. A gaming machine as claimed in claim 9, wherein the second game controller is configured to determine the second game outcome based on the adjustment command.

11. A gaming machine as claimed in claim 9, wherein the first game controller is provided by a player marketing module.

12. A gaming machine as claimed in claim 1, wherein the first player interface is provided by a player marketing module.

13. A gaming machine as claimed in claim 1, wherein the first player interface comprises a first display and a first instruction input mechanism.

14. A gaming machine as claimed in claim 1, wherein the second player interface comprises a second display and a second instruction input mechanism.

15. A method of gaming at a gaming machine having a first player interface, a second player interface, a game controller and an adjustment calculator, and using adjustment data, the method comprising:

receiving an input of at least one first game instruction in relation to a free first game by a player via the first player interface;

receiving an input of at least one second game instruction in relation to a game play of a second game by the player via the second player interface, said second game being different than said first game;

processing via the game controller the at least one first game instruction to determine a first game outcome of the first game;

providing the first game outcome to the adjustment calculator;

determining via the adjustment calculator whether an adjustment to the game play of the second game is to be generated based on the adjustment data;

generating an adjustment command in response to determining that an adjustment is to be generated; and controlling the play of the second game via the second player interface independent of the first player interface based at least in part on the generated adjustment command.

16. A method of gaming as claimed in claim 15, and further comprising controlling play of the second game by adjusting the game outcome of the second game, based on the adjustment command.

17. A method of gaming as claimed in claim 16, and further comprising adjusting the possible outcomes of the second game based on the adjustment command.

18. A method of gaming as claimed in claim 17, wherein the possible outcomes of a second game are adjusted by adjusting available prizes and/or types of prizes.

19. A method of gaming as claimed in claim 16, wherein the possible outcome of a second game is adjusted by modifying a win amount.

20. A method of gaming as claimed in claim 15, and further comprising adjusting play of the second game by providing free games in the second game.

* * * * *

UNITED STATES PATENT AND TRADEMARK OFFICE

CERTIFICATE OF CORRECTION

PATENT NO. : 8,777,728 B2
APPLICATION NO. : 12/118148
DATED : July 15, 2014
INVENTOR(S) : Boesen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 177 days.

Signed and Sealed this
Twenty-ninth Day of December, 2015

Michelle K. Lee
*Director of the United States Patent and Trademark Office*